United States Patent [19]

Grauer

[11] Patent Number: 5,185,406
[45] Date of Patent: Feb. 9, 1993

[54] PROCESS FOR THE PREPARATION OF AN ELASTOMER-CONTAINING VINYL CHLORIDE GRAFT COPOLYMER

[75] Inventor: Peter Grauer, Burgkirchen, Fed. Rep. of Germany

[73] Assignee: Wacker Chemie GmbH, Munich, Fed. Rep. of Germany

[21] Appl. No.: 573,030

[22] PCT Filed: Feb. 19, 1989

[86] PCT No.: PCT/EP89/00094
§ 371 Date: Jul. 27, 1990
§ 102(e) Date: Jul. 27, 1990

[87] PCT Pub. No.: WO89/07115
PCT Pub. Date: Aug. 10, 1989

[30] Foreign Application Priority Data

Feb. 2, 1988 [DE] Fed. Rep. of Germany ....... 3803036

[51] Int. Cl.$^5$ .................... C08F 263/04; C08F 2/18
[52] U.S. Cl. ...................... 525/262; 525/57; 525/260; 525/263; 525/302; 525/308; 525/309; 525/324; 525/317
[58] Field of Search ............... 525/57, 260, 262, 263, 525/302, 308, 309, 324, 317

[56] References Cited

U.S. PATENT DOCUMENTS

| 3,068,192 | 12/1962 | White | 525/302 |
| 3,358,054 | 12/1967 | Hardt et al. | 525/302 |
| 3,432,576 | 3/1969 | Beer | 525/302 |
| 4,162,239 | 7/1979 | Nicolet et al. | 525/262 |
| 4,208,490 | 6/1980 | Kondo et al. | 525/243 |
| 4,357,445 | 11/1982 | Steffen et al. | 525/302 |
| 4,806,581 | 2/1989 | Walker | 525/302 |
| 4,981,907 | 1/1991 | Klippert et al. | 525/262 |

FOREIGN PATENT DOCUMENTS

| 4825422 | 7/1973 | Japan | 525/302 |
| 59-217710 | 12/1984 | Japan | 525/302 |
| 61-73715 | 4/1986 | Japan | 525/262 |

Primary Examiner—James J. Seidleck
Assistant Examiner—Vasu S. Jagannathan
Attorney, Agent, or Firm—Burgess, Ryan & Wayne

[57] ABSTRACT

A process for preparing an elastomer-containing vinyl chloride graft copolymer having an elastomer content of up to 65% by weight. The process comprises forming a mixture of an elastomer dispersion, water, buffer and initiator, adding a precipitating agent; after precipitation has occurred, metering into the mixture the grafting monomer and a protective colloid; and then subjecting the mixture to suspension polymerization conditions. The graft copolymeric material is useful as an impact modifier or as plasticizer-free flexible PVC.

22 Claims, No Drawings

PROCESS FOR THE PREPARATION OF AN ELASTOMER-CONTAINING VINYL CHLORIDE GRAFT COPOLYMER

BACKGROUND OF THE INVENTION

1. Field of the Invention

The invention relates to a process for the preparation of an elastomer-containing vinyl chloride graft copolymer having a high bulk density and very good flow by the suspension polymerization process.

2. Description of the Related Art

Processes for the preparation of elastomercontaining graft copolymers using vinyl chloride as the grafting monomer are known.

A process for the preparation of polyacrylatecontaining graft copolymers of vinyl chloride by suspension polymerization in the presence of a protective colloid and a $H_2O$ or oil-soluble initiator, the graft base being added as an emulsion, is described in DE-AS 1 082 734. The process according to DE-AS 1 090 856 describes an improved process variant of the above Auslegeschrift. Vinyl and allyl compounds which are copolymerizable with vinyl chloride are also employed as grafting monomers in order to elastify the PVC content of the graft copolymer. Another process variant using a crosslinked graft base is claimed in DE-AS 1 090 857.

However, a disadvantage of all these processes is that polymer deposits form on the wall surfaces and equipment components of the polymerization reactor in the course of the polymerization, especially if the elastomer content in the graft copolymer is relatively high. The product moreover has a wide particle size distribution. The polymer tends to stick, has poor flow properties and has only a low bulk density.

A process in which vinyl acetate/ethylene copolymer in the solid state is employed as the graft base is claimed in DE-A 1 495 694 (U.S. Pat. No. 3,358,054). The solid VAE copolymer is dissolved in the vinyl chloride monomer phase, the solution is dispersed in water and grafting is carried out by the suspension polymerization process. DE-A 1 495 802 is an Application for a Patent of Addition to DE-A 1 495 694, in which, to standardize the particle size distribution, the weight ratio of the aqueous phase to the sum of the graft substrate and grafting monomer has been reduced to 1.5 : 1 to 0.5 : 1. A disadvantage of this process is the time-consuming and complicated step of dissolving the solid resin. Because of the rapidly rising viscosity of the solution, it is difficult to achieve solid resin contents above 15%. Inhomogeneities in respect of the graft copolymer composition, which lead to a considerable reduction in product quality, furthermore occur in this process, especially in the case of short dissolving times for the solid resin.

EP-A 195 942 relates to a process for the preparation of a free-flowing polyacrylate/vinyl chloride graft copolymer by suspension polymerization in the presence of methylcellulose as a protective colloid. The graft base, which is present in emulsion, is initially introduced into the vessel together with the protective colloid, coagulation is carried out by addition of a $Ca(OH)_2$ suspension, and after neutralization, grafting is carried out, the peroxide initiator being added and vinyl chloride being forced in. The disadvantage of this process is that only relatively coarse products of low bulk density can be obtained by it.

U.S. Pat. No. 4,208,490 claims a process for the preparation of graft copolymers in which the elastomeric graft substrate is initially introduced into the vessel as an emulsion, together with the ethylenically unsaturated grafting monomer and the initiator, and the polymerization is conducted as an emulsion polymerization up to a conversion of 5% of the grafting monomer. Only then, after addition of the protective colloid, is the polymerization continued as a suspension polymerization, without the graft base added as an emulsion being coagulated.

The object was therefore to develop a process for the preparation of elastomer-containing vinyl chloride graft copolymers having a high elastomer content of up to 65% by weight without the disadvantages described above in respect to product quality and processability. Above all, the graft copolymer should have a high bulk density, very good flow properties and a homogeneous distribution of the flexible phase.

Surprisingly, this has been achieved by the metering process according to the invention and by the use of a specific protective colloid.

SUMMARY OF THE INVENTION

The invention relates to a process for the preparation of an elastomer-containing vinyl chloride graft copolymer having an elastomer content of up to 65% by weight by suspension polymerization at a temperature of 50° to 80° C. under a pressure which corresponds at most to the saturation pressure of vinyl chloride at the polymerization temperature chosen, and a weight ratio of water to the sum of graft substrate and grafting monomer of 1.6 : 1 to 1 : 1, which comprises a) initially introducing the elastomer dispersion into the vessel, together with the polymerization water, the buffer and the initiator,
b) adding the precipitating agent as an aqueous solution,
c) only after the precipitation has taken place metering in the protective colloid and the grafting monomer, and if appropriate the regulator, and
d) using polyvinyl alcohol having a degree of hydrolysis of a $\geq 70\%$ and a viscosity of $\geq 5$ cp ($5 \times 10^3$ Pa.s) as the protective colloid.

DESCRIPTION OF THE PREFERRED EMBODIMENTS

Vinyl acetate/ethylene copolymers having an ethylene content of 20 to 70% by weight or homo- or copolymers of acrylic acid esters are employed as the graft base. The copolymers of acrylic acid esters or the VAE copolymers can contain, for example, poly-ethylenically unsaturated, crosslinking compounds, such as vinyl and allyl esters of unsaturated $C_3$- to $C_6$-monocarboxylic acids, mono- or divinyl and diallyl esters of saturated or unsaturated $C_4$- to $C_{10}$-dicarboxylic acids as well as triallyl cyanurate and other allyl ethers of polyfunctional alcohols, up to a content of 0.5% by weight. Crosslinked homopolymers of esters of acrylic acid and saturated alcohols having 2 to 18 C atoms are preferably employed. Crosslinked poly(butyl acrylate) is particularly preferred.

The elastomer is preferably employed as a latex having a solids content of 30 to 60% by weight. For the graft copolymerization, the elastomer latex is initially introduced into the vessel together with the initiator system and further additives, such as, for example, buffer.

Monomer-soluble agents which form free radicals and which belong to the group of peroxides and azo initiators and have a half-life at the particular polymerization temperature of one to 20 hours are employed as initiators. Examples of peroxides which can be employed are dialkyl, diacyl or diaroyl peroxides, such as dilauroyl or diacetyl peroxide, or peroxodicarbonates, such as di-tert.-butylcyclohexyl or dimyristyl peroxodicarbonate, or peresters. Examples of customary azo initiators are azobisisobutyronitrile and azobisdimethylvaleronitrile. If appropriate, reducing agents can also additionally be employed. The catalysts can be employed individually or as a mixture in amounts of preferably 0.01 to 1.0% by weight, based on the grafting monomers.

Customary buffers are Na carbonate, Na tetraborate, Na hydrogen phosphate and alkali metal phosphates and acetates. The buffer is usually employed in concentrations of 0.005 to 0.5% by weight, based on the grafting monomer.

After the elastomer latex has been initially introduced into the vessel, it is coagulated by addition of a precipitating agent. Alkali metal or alkaline earth metal salts of inorganic or organic acids are preferably employed as the precipitating agent. Examples of these are $CaCl_2$, $BaCl_2$ and Ca acetate. The precipitating agent is employed as an aqueous solution, preferably in a concentration of up to 20% by weight.

After the coagulation has been carried out, the protective colloid and the grafting monomer are added, if appropriate with addition of a regulator.

Regulators which can be employed, for adjusting the K value of the grafted product, are, for example, chlorohydrocarbons, such as di- and trichloroethylene or chloroform, or aliphatic aldehydes, in amounts of up to 5% by weight, based on the grafting monomers.

Polyvinyl alcohols having a degree of hydrolysis of $\geq 70\%$ and a viscosity of a 5 cp ($5 \times 10^{-3}$ Pa.s), preferably in an amount of 0.1 to 1.0% by weight, based on the amount of grafting monomer, are used as protective colloids.

The preferred grafting monomer is vinyl chloride, but mixtures of vinyl chloride with vinyl monomers, the homopolymers of which have glass transition temperatures of $\geq 50°$ C., can also be employed. Examples of these are methyl (meth)acrylate, styrene and vinyl acetate. The amount of grafting monomer added is adjusted so that the weight ratio of grafting monomer to elastomer is 1.15 : 1 to 1.7 : 1. The polymerization temperature is 50° to 80° C., preferably 55° to 70° C., depending on the desired K value of the end product. The weight ratio of water to the sum of the graft substrate and grafting monomer is 1.6 : 1 to 1 : 1. At a pressure drop of from 3 to 5 bar ($3 \times 10^5$ to $5 \times 10^5$ Pa), the polymerization is ended by distilling off the unreacted vinyl chloride.

After degassing, the product is dehydrated via a spinner or centrifuge and dried in a drier.

The graft copolymers prepared by the process according to the invention have a high bulk density (480 to 630 g/l), very good flow properties and a homogeneous distribution of the flexible phase.

The graft copolymers are suitable both for use as impact modifiers for extrusion and injection molding purposes, and also in the pure form for plasticizer-free flexible PVC uses.

The following examples serve to further illustrate the invention.

EXAMPLES 1 TO 8

In Examples 1 to 8, the procedure according to the invention is used to prepare elastomer-containing VC graft copolymers.

The amounts of water employed in the polymerization and the nature and amount of buffer substances, initiators, elastomer dispersion, Ca salt, polyvinyl alcohol protective colloid, regulator, VC monomer and comonomers are shown in Table 1, as are the polymerization temperature and the pressure drop at which the polymerization is interrupted. Table 1 also shows the flow properties, bulk density and elastomer content of the VC graft copolymers obtained in the examples.

In Examples 1 to 8, the water, the buffer substances, the initiators and the elastomer dispersion are initially introduced into the vessel. The autoclave is then closed and evacuated briefly. The precipitating agent is added as a 10% strength aqueous solution. After stirring for 15 minutes, the protective colloid is metered in and the autoclave is evacuated again. If appropriate the regulator and the comonomer (here VAc) are added next. The VC monomer is then subsequently metered in and the mixture is stirred for a further 45 minutes. It is then heated to the desired polymerization temperature and polymerization is carried out up to the desired pressure drop. After unreacted VC monomer has been removed, the autoclave is cooled and the suspension is drained off. The product is filtered off and dried in vacuo at 50° C.

The bulk density is determined in accordance with DIN 53468. The flow properties are determined in accordance with DIN 53492 (nozzle 1, discharge opening 10 mm). Comparison Examples 1 to 3:

The amounts of water employed in the polymerization and the nature and amount of buffer substances, initiator, elastomer dispersion, Ca salt, protective colloid and VC monomer are shown in Table 2. This table also shows the polymerization temperature and the pressure drop at which the polymerization is interrupted, as well as the bulk density and flow properties of the products of the comparison examples. The bulk density and flow properties are determined analogously to Examples 1 to 8.

COMPARISON EXAMPLE 1

The water, buffer substances, initiator and elastomer dispersion are initially introduced into the vessel, together with the protective colloid, at room temperature; the reactor is closed and evacuated thoroughly. Thereafter, the VC monomer is metered in, the mixture is stirred for 15 minutes and only at the end is the precipitating agent added. After stirring for one hour, the mixture is heated to 58° C. and polymerization is carried out up to a pressure drop of 3.5 bar ($3.5 \times 10^5$ Pa). A very coarse product results.

COMPARISON EXAMPLE 2

The procedure is analogous to Comparison Example 1, with the difference that cellulose ether is used as the protective colloid instead of polyvinyl alcohol. An extremely coarse product (particle diameter 1–5 mm) is obtained. The bulk density and flow properties cannot be measured.

COMPARISON EXAMPLE 3

As Comparison Example 1, except that the protective colloid is not added to the initial mixture, but only 15 minutes after the addition of the precipitating agent. Here also a very coarse product is obtained.

Table 3 shows the particle size distribution of the VC graft copolymers in the procedure according to the invention (Example 1) and of the products from Comparison Example 1 and 2.

Only the procedure according to the invention gives products with optimum properties in respect of particle size, bulk density and flow properties.

TABLE 1

|  | Example 1 | Example 2 | Example 3 | Example 4 | Example 5 | Example 6 | Example 7 | Example 8 |
|---|---|---|---|---|---|---|---|---|
| Water | 184 | 159 | 159 | 184 | 159 | 180 | 130 | 135 |
| Citric acid | 0.01 | 0.01 | 0.01 | 0.01 | 0.01 | 0.01 | 0.01 | 0.01 |
| $Na_2HPO_4$ | 0.01 | 0.01 | 0.01 | 0.01 | 0.01 | 0.01 | 0.01 | 0.01 |
| Lauryl peroxide | 0.05 | 0.07 | 0.08 | 0.08 | 0.08 | 0.06 | 0.04 | 0.04 |
| t-Butyl-cyclohexyl peroxodicarbonate | 0.025 | — | — | — | — | 0.02 | — | — |
| Myristyl percarbonate | — | — | — | — | — | — | 0.01 | — |
| Polybutyl acrylate (40% strength in $H_2O$) | 158 | 200 | 200 | 158 | 200 | 200 | — | — |
| VAE dispersion (40% strength in $H_2O$) | — | — | — | — | — | — | 200 | 190 |
| $CaCl_2$* | 1.2 | 1.4 | 1.4 | 1.2 | 1.4 | 1.3 | 2 | 2 |
| Polyvinyl alcohol (degree of hydrolysis: 82%) | 0.3 | 0.4 | 0.5 | 0.5 | 0.5 | 0.4 | 0.4 | 0.4 |
| Trichloroethylene | — | — | — | 2.0 | 2.0 | — | — | — |
| Vinyl acetate monomer | — | — | 4 | — | — | — | — | — |
| Vinyl chloride monomer | 100 | 100 | 96 | 100 | 100 | 100 | 100 | 100 |
| Polymerization temperature [°C.] | 58 | 65 | 65 | 65 | 65 | 58 | 60 | 65 |
| Pressure drop [× $10^5$ Pa] | 3.5 | 4.5 | 4.5 | 3.5 | 4.5 | 4.5 | 4.5 | 4.5 |
| Flow properties [seconds] | 24.0 | 22.0 | 25.0 | 23.4 | 22.2 | 24.6 | 17.4 | 15.5 |
| Bulk density [g/l] | 575 | 610 | 481 | 540 | 600 | 630 | 517 | 612 |
| Elastomer content [% by weight] | 46.8 | 52.9 | 52.2 | 51.7 | 54.3 | 49.3 | 50.7 | 52.1 |

*Example 2 to Example 5: Cu acetate

TABLE 2

|  | Comparison Example 1 | Comparison Example 2 | Comparison Example 3 |
|---|---|---|---|
| Water | 155 | 155 | 155 |
| Citric acid | 0.01 | 0.01 | |
| $Na_2HPO_4$ | 0.01 | 0.01 | 0.01 |
| Myristyl percarbonate | 0.05 | 0.05 | 0.05 |
| Polybutyl acrylate (40% strength in $H_2O$) | 158 | 158 | 158 |
| $CaCl_2$ | 1.4 | 1.4 | 1.4 |
| Polyvinyl alcohol (degree of hydrolysis: 82%) | 0.4 | — | 0.4 |
| Cellulose ether (MHPC*, 100 mPa.s in 2% strength solution) | — | 0.4 | — |
| Vinyl chloride monomer | 100 | 100 | 100 |
| Polymerization temperature [°C.] | 58 | 58 | 58 |
| Pressure drop [× $10^5$ Pa] | 3.5 | 3.5 | 3.5 |
| Flow properties [seconds] | 39.1 | not measurable | 26.2 |
| Bulk density [g/l] | 540 | not measurable | 575 |

*Methylhydroxypropylcellulose

TABLE 3

|  | Total sieve analysis [%] | | | | |
|---|---|---|---|---|---|
|  | >300 μm | >200 μm | >100 μm | >60 μm | >40 μm |
| Example 1 | 6 | 16 | 59 | 82 | 94 |
| Comparison Example 1 | 27 | 47 | 76 | 89 | 96 |
| Comparison Example 2 | | Particle size 1–5 mm | | | |
| Comparison Example 3 | 41 | 56 | 81 | 96 | 100 |

I claim:

1. A process for the preparation of a graft copolymer containing a grafting monomer containing vinyl chloride and an elastomeric graft substrate, the elastomeric graft substrate being present in an amount of up to 65% by weight and selected from the group consisting of vinyl acetate/ethylene copolymers having an ethylene content of from 20 to 70% by weight and homo- and copolymers of acrylic acid esters, said process being conducted by suspension polymerization in the presence of water at a temperature of 50°-80° C. at a pressure of up to the saturation pressure of vinyl chloride at the polymerization temperature, wherein the weight ratio of water to the sum of the graft substrate and the grafting monomer is from 1.6:1 to 1:1, said process comprising:

(a) introducing a dispersion containing the graft substrate, water, a buffer and a polymerization initiator into a reaction vessel;

(b) adding an aqueous solution of a precipitating agent to the reaction vessel;

(c) allowing a precipitate to form in the reaction vessel; and (d) after the precipitate has formed, adding a protective colloid comprising polyvinyl alcohol having a degree of hydrolysis of equal to or greater than 70% and a viscosity of equal to or greater than 5 co ($5 \times 10^{-3}$ Pa·s), and the grafting monomer to the reaction vessel to form said elastomeric graft copolymer.

2. The process of claim 1, wherein said copolymers contain poly-ethylenically unsaturated cross-linking compounds.

3. The process of claim 2, wherein the poly-ethylenically unsaturated cross-linking compounds are present in an amount of up to 0.5% by weight.

4. The process of claim 1, wherein the elastomeric graft substrate is a cross-linked homopolymer of an ester of acrylic acid and a saturated alcohol having from 2 to 18 carbon atoms.

5. The process of claim 4 wherein said cross-linked homopolymer is poly(butyl acrylate).

6. The process of claim 1, wherein the elastomeric graft substrate has a solid content of from 30 to 60% by weight.

7. The process of claim 1, wherein the polymerization initiator is selected from the group consisting of dialkyl peroxide, diacyl peroxides, diaroyl peroxides, azobisisobutyronitrile and azobisdimethylvaleronitrile.

8. The process of claim 1, wherein the polymerization initiator is present in an amount of from 0.1 to 1.0% by weight, based on the weight of the grafting monomer.

9. The process of claim 1, wherein the buffer is present in an amount of from 0.005 to 0.5% by weight, based on the weight of the grafting monomer.

10. The process of claim 1, wherein the precipitating agent is selected from alkali metal and alkaline earth metal salts of inorganic and organic acids.

11. The process of claim 10 wherein the precipitating agent is an aqueous calcium acetate solution.

12. The process of claim 1, wherein the concentration of the precipitating agent in said aqueous solution is 20% by weight.

13. The process of claim 1, further comprising adding a polymerization regulator to the reaction vessel.

14. The process of claim 13, wherein the polymerization regulator is selected from chlorohydrocarbons and aliphatic aldehydes.

15. The process of claim 13, wherein the polymerization regulator is present in an amount of up to 5% by weight.

16. The process of claim 1, wherein the polyvinyl alcohol is present in an amount of 0.1 to 1.0% by weight based on the weight of the grafting monomer.

17. The process of claim 1, wherein the grafting monomer is selected from vinyl chloride and mixtures of vinyl chloride with vinyl monomers whose homopolymers have a glass transition temperature of equal to or less than 50° C.

18. The process of claim 17, wherein the vinyl monomer is selected from methyl(meth) acrylate, styrene and vinyl acetate.

19. The process of claim 1, wherein the weight ratio of the grafting monomer to the elastomeric graft substrate is 1.15:1 to 1.7:1.

20. The process of claim 1, wherein the reaction is conducted at temperature of from 55° to 70° C.

21. A graft copolymer produced by the process of claim 1.

22. In an extrusion and injection molding process which utilizes an impact modifier, the improvement which comprises using as said impact modifier, the graft copolymer of claim 21.

* * * * *

UNITED STATES PATENT AND TRADEMARK OFFICE
CERTIFICATE OF CORRECTION

PATENT NO. : 5,185,406
DATED : February 9, 1993
INVENTOR(S) : Peter Grauer It is certified that error appears in the above-identified patent and that said Letters Patent is hereby corrected as shown below:

Title page:

Item [22], Change "February 19, 1989" to -- February 2, 1989 --.

Signed and Sealed this

Fourth Day of January, 1994

*Attest:*

BRUCE LEHMAN

*Attesting Officer*     *Commissioner of Patents and Trademarks*